(12) United States Patent
Le Thierry D'ennequin et al.

(10) Patent No.: US 8,942,638 B2
(45) Date of Patent: Jan. 27, 2015

(54) WIRELESS DEVICE DETECTION

(75) Inventors: Christophe Le Thierry D'ennequin, Tokyo (JP); Toshiaki Jozawa, Tokyo (JP)

(73) Assignee: Nokia Corporation, Espoo (FI)

( * ) Notice: Subject to any disclaimer, the term of this patent is extended or adjusted under 35 U.S.C. 154(b) by 1120 days.

(21) Appl. No.: 12/745,406

(22) PCT Filed: Nov. 28, 2007

(86) PCT No.: PCT/EP2007/062933
§ 371 (c)(1),
(2), (4) Date: Jul. 21, 2010

(87) PCT Pub. No.: WO2009/068089
PCT Pub. Date: Jun. 4, 2009

(65) Prior Publication Data
US 2010/0311347 A1 Dec. 9, 2010

(51) Int. Cl.
| | | |
|---|---|---|
| *H04B 17/00* | (2006.01) | |
| *H04L 29/08* | (2006.01) | |
| *H04N 1/32* | (2006.01) | |
| *H04N 5/232* | (2006.01) | |
| *H04W 8/00* | (2009.01) | |
| *H04M 1/725* | (2006.01) | |
| *H04N 101/00* | (2006.01) | |

(52) U.S. Cl.
CPC ............ *H04L 67/06* (2013.01); *H04N 1/32106* (2013.01); *H04N 1/32128* (2013.01); *H04N 5/232* (2013.01); *H04W 8/005* (2013.01); *H04L 67/18* (2013.01); *H04M 1/72555* (2013.01); *H04N 2101/00* (2013.01); *H04N 2201/0084* (2013.01); *H04N 2201/3205* (2013.01); *H04N 2201/3225* (2013.01); *H04N 2201/3274* (2013.01); *H04N 2201/3278* (2013.01)
USPC ........................................................ 455/67.11

(58) Field of Classification Search
CPC ..... H04N 5/232; H04W 16/28; H04W 48/10; H04W 84/10; H04W 4/008; H04B 7/026; H04B 1/3816; H04L 67/18
USPC ............................................... 455/500, 67.11
See application file for complete search history.

(56) References Cited

U.S. PATENT DOCUMENTS

| | | | |
|---|---|---|---|
| 7,016,899 B1 | 3/2006 | Stern et al. | |
| 2002/0142800 A1* | 10/2002 | Iimura et al. | 455/556 |
| 2003/0103149 A1* | 6/2003 | Kinjo et al. | 348/231.5 |

(Continued)

FOREIGN PATENT DOCUMENTS

| | | |
|---|---|---|
| GB | 2403099 A | 12/2004 |
| JP | 2004080347 A | 3/2004 |

(Continued)

OTHER PUBLICATIONS

International Search Report and Written Opinion of the International Searching Authority of PCT/EP2007/062933, dated Dec. 16, 2008, pp. 1-13.

*Primary Examiner* — Ankur Jain
(74) *Attorney, Agent, or Firm* — Harrington & Smith

(57) ABSTRACT

The present invention relates to the detection at least one wireless communication device associated with an entity on an image. The invention further relates to transmitting information enabling detection of a wireless communication device associated with an entity on an image. The detection is performed before, during, or after capture of the image.

19 Claims, 7 Drawing Sheets

(56) References Cited

U.S. PATENT DOCUMENTS

| | | |
|---|---|---|
| 2004/0126038 A1 | 7/2004 | Aublant et al. |
| 2004/0263631 A1* | 12/2004 | Brittan et al. ............. 348/207.1 |
| 2006/0013576 A1 | 1/2006 | Sauder |
| 2006/0110154 A1* | 5/2006 | Hulsen et al. ................. 396/310 |
| 2006/0170956 A1* | 8/2006 | Jung et al. .................... 358/1.15 |
| 2008/0077635 A1* | 3/2008 | Sporny et al. ................ 707/204 |
| 2009/0109950 A1* | 4/2009 | Richardson et al. .......... 370/345 |

FOREIGN PATENT DOCUMENTS

| | | |
|---|---|---|
| WO | 2004/066613 A | 8/2004 |
| WO | 2005/043270 A | 5/2005 |
| WO | 2007/036842 A | 4/2007 |

\* cited by examiner

WIRELESS DEVICE DETECTION

RELATED APPLICATION

This application was originally filed as PCT Application No. PCT/EP2007/062933 filed Nov. 28, 2007.

FIELD

The invention relates to the field of wireless device detection.

BACKGROUND

The proportion of those wireless devices, in particular mobile phones and personal digital assistants (PDA), which either include a fixed camera or allow connection to a detachable camera is steadily increasing. Increasing miniaturization in electronics allows these mobile devices to capture and store in memory ever more images of ever better quality. In fact, not only individual photographs may be captured by these devices but also moving images with sound and thus entire film clips. This improvement in functionality and quality makes itself felt not only in an increase of the resolution of the images but also, for example, of the zoom capability of the image capturing device. The fact that these devices are at hand for almost everybody almost all of the time makes taking impromptu snapshots of high quality very attractive and convenient. The virtually non-existent marginal cost of each individual image also contributes to this. However, this ever increasing number of taken and stored images makes it ever more important to be able to quickly find all images with, for example, a given person on them or all images captured at a specific location. Also, apart from making the actual capturing of the image possible and convenient, the communication capabilities of the mobile devices used for capturing the images make it also very easy to share the images with other people. This option of course adds to the allure of capturing the images in the first place. However, whereas the actual capture of the image is in general conveniently accomplished with just a few pushes or even only a single push of a button, immediately sharing the image is not so easily achieved. Especially when an image of a group of people is captured, some or all of whom may not be well known to the person capturing the image, sharing the image with everybody on it can become tedious. Contact information for people not in the address book has to be individually surveyed, entered and then used to determine a way to transfer the image data.

SUMMARY

In a first aspect of the invention, a method is disclosed which comprises detecting at least one wireless communication device associated with an entity on an image. The detecting is performed before the capture of the image, during the capture of the image, or after the capture of the image.

Also, a computer program code is disclosed, which realizes the disclosed method when executed by a processor.

Further, a computer program product is disclosed in which such a program code is stored in a computer readable medium. The computer program product could be for example a separate memory device, or a memory that is to be integrated in an electronic device.

Moreover, an apparatus is disclosed comprising a detecting component configured to detect at least one wireless communication device associated with an entity on an image. The detecting component is configured to detect the at least one wireless communication device either before the capture of the image, during the capture of the image, or after the capture of the image.

Also disclosed is an apparatus that comprises means for detecting at least one wireless communication device associated with an entity on the image. This detecting is performed before capture of the image, during capture of the image, or after capture of the image. The means for detecting comprised in the apparatus may be configured to detect at least one wireless communication device comprising a user interface.

In addition, a system is disclosed which firstly comprises at least one wireless communication device. The system secondly comprises a detecting device configured to detect at least one wireless communication device if the wireless communication device is associated with an entity on an image. This detecting device is configured to detect the at least one wireless communication device before capture of the image, during capture of the image, or after capture of the image.

Yet further a protocol is disclosed which defines a sequence of a detection of at least one wireless communication device. This wireless communication device is associated with an entity on an image before image capture, during image capture, or after image capture.

According to the first aspect of the present invention, the entity on the image may be a person or an object. A wireless communication device may be associated with a person if, for example, it is owned by that person, if the person is carrying this wireless communication device in a pocket, hand or bag. The person may also have temporarily placed the wireless communication device at some distance, but still within reach, like for example on a table in the vicinity of the person. The wireless communication device may also be associated with an object by being physically attached to the object, or, in case the object is stationary, by also being made immobile in a vicinity of the object.

An image is a photograph, which is either analog or digital, and thus a still picture, or a sequence of such pictures, also either analog or digital, which may constitute a moving picture when viewed in succession. An entity is said to be on an image if the entity is visible in total or in part on the image. An image is captured in the moment that the picture is taken, i.e. in the moment that the either analog or digital data constituting the image is generated by means of optical information present at the time of capture.

The at least one wireless communication device may be a mobile phone, a personal digital assistant, a pager, a mobile camera, a portable music player, a portable video player, or a navigation device. It may also combine all or some of these functionalities. The at least one wireless communication device may also comprise a user interface. This user interface may comprise a display, a keypad, a microphone, an audio speaker, or light emitting diodes.

The detecting component can be implemented in hardware and/or software. It may comprise for instance a processor executing software program code for realizing the required functions. Alternatively, it could be for instance a circuit that is designed to realize the required functions, for instance implemented in a chipset or a chip, like an integrated circuit. The disclosed apparatus could further be for example a module provided for integration into a device, like a hand-held camera or an accessory device for a wireless communication terminal. The disclosed apparatus may be a module for a device configured for image capture. The described apparatus may also be a module for a wireless communication device.

Detecting the at least one wireless communication may comprise the use of a directional antenna. The directional antenna may be any kind of a wide variety of known directional antennas. The directional antenna may be a single antenna (with one or more antenna elements) with adaptable radiation characteristic, or it may comprise a plurality of directional antennas with fixed radiation characteristic which are selectively activated or deactivated.

Every image defines an angle of view with which it is taken, was taken or is going to be taken. In an exemplary embodiment of the invention, the radiation characteristic of the directional antenna may be adapted to an angle of view of the image. This means that only signals with angles of incidence that are within the angle of view of the image are detected by the directional antenna.

An identifier of the entity or of the at least one wireless communication device may be stored with the captured image. This identifier may either have been determined and supplied by the entity or the wireless communication device with which the entity is associated, or it may have been determined by the apparatus capturing and storing the image. The identifier may be the name of the entity with which the wireless communication device is associated, it may be an identifier given to the wireless communication device by its owner, it may be an identifier automatically generated by the apparatus capturing the image, or it may be an identifier determined by the user of the apparatus capturing the image.

The captured image may be associated with a database entry associated with the entity with which the at least one detected wireless communication device is associated. In particular, if the entity, for example a person, has an entry in an address book, then the captured image may be associated with that person's address book entry.

After the image has been captured, it may be transmitted to the detected wireless communication device associated with the entity captured on the image. The image may be transmitted using the wireless communication protocol with which the wireless communication device was detected, or it may be transmitted using another wireless communication protocol, for example the wireless communication protocol of a cellular communication system.

Detecting the at least one wireless communication device may comprise receiving a signal from the at least one wireless communication device. This may be a signal that is broadcast for the purpose of allowing detection of the wireless communication device by an apparatus comprising image capturing means.

This signal received from the at least one wireless communication device may comprise an identifier of the wireless communication device or of the entity with which the wireless communication device is associated. The identifier may be the name of the entity with which the wireless communication device is associated, it may be an identifier given to the wireless communication device by its owner, or it may be an identifier used by the wireless communication device for the medium access control of the data link layer of the wireless communication protocol.

The signal received from the at least one wireless communication device may also comprise sensor information. The sensor information may be, for instance, a temperature detected by the wireless communication device, or it may be a position information determined from a positioning functionality, for example the global positioning system (GPS), available to the wireless communication device, to name but a few examples.

The signal received from the at least one wireless communication device may be transmitted by the at least one wireless communication device without being triggered by the device capturing the image. This signal may be a signal that the wireless communication device is broadcasting because the broadcast is required by the wireless communication protocol for establishing a connection with peer wireless communication devices.

Detecting the at least one wireless communication device may comprise transmitting to the at least one wireless communication device a signal triggering the transmission of the signal received from the at least one wireless communication device. In this case the wireless communication device may not transmit this signal unless it has received the triggering signal.

Receiving the signal from the at least one wireless communication device may be possible from a spatial angle that is wider than the spatial angle corresponding to the angle of view of the captured image. Even if the wireless communication device is not within the area defined by the angle of view of the image capturing means in which all the entities on the captured image are, the signal transmitted from the wireless communication device may still be received by the image capturing device.

The signal received from the at least one wireless communication device may comprise an information about the strength of the triggering signal received by the wireless communication device.

An identifier of the at least one detected wireless communication device or of the entity with which it is associated may be stored with the captured image. This identifier may be the name of the person with which the wireless communication device is associated.

It may be that the identifier of the at least one detected wireless communication device or of the entity with which it is associated is only stored with the captured image after it has been determined that the identifier of the at least one detected wireless communication device shall be stored with the captured image.

It may be determined whether or not to store with the captured image an identifier of the at least one detected wireless communication device or of the entity with which it is associated depending on the determined distance of the at least one detected wireless communication device. It may be that if the determined distance exceeds a certain value, the identifier is not stored with the captured image and that it is stored, if the determined distance does not exceed a certain value. It may also be that the identifier is not stored with the captured image if the determined distance is below a certain value. It may also be that the identifier is only stored with the captured image if the determined distance is within a distance range given by a lower distance threshold and an upper distance threshold.

When determining whether or not to store with the captured image an identifier of the at least one detected wireless communication device or of the entity with which it is associated depending on the determined distance of the at least one detected wireless communication device, determining the distance may comprise evaluating the information comprised in the received signal about a signal strength of the signal transmitted to the at least one wireless communication device. This may be the received signal strength of the triggering signal transmitted to the at least one wireless communication device.

When determining whether or not to store with the captured image an identifier of the at least one detected wireless communication device or of the entity with which it is associated depending on the determined distance of the at least one detected wireless communication device, determining the distance may comprise evaluating a signal strength of the signal received from the wireless communication device.

Determining whether or not to store with the captured image an identifier of the at least one detected wireless communication device or of the entity with which it is associated may also depend on an information comprised in the received signal. This information may for example be a request or a permission to store the identifier of the at least one detected wireless communication device with the captured image, or the information may deny permission to store the identifier with the captured image.

The captured image may be associated with a database entry associated with the entity with which the at least one detected wireless communication device is associated. The database entry may be an entry in an address book associated with the owner of the detected wireless communication device. This database may be comprised in the device capturing the image or it may be in a different device.

The captured image may be transmitted to the at least one detected wireless communication device.

It may be determined whether or not to send the captured image to the at least one detected wireless communication device depending on an information comprised in the received signal. If it is determined to send the captured image to the at least one detected wireless communication device, then the captured image is sent to the at least one detected wireless communication device. This information may for example be a request or a permission to send the captured image to the at least one detected wireless communication device, or the information may deny permission to send the captured image to the at least one detected wireless communication device.

The disclosed protocol may comprise a definition of a transmission of a signal to the at least one detected wireless communication device. This signal may trigger a response from the at least one detected wireless communication device.

Further, the disclosed protocol may comprise a definition of a reception of a signal from the at least one detected wireless communication device. This signal may be triggered by a signal from the image capturing device or it may be broadcast by the wireless communication device without being triggered by a received signal.

The disclosed protocol may in addition comprise a definition of a reception of a signal from the at least one detected wireless communication device, wherein the signal comprises an information about a received signal strength of the signal triggering a response. This signal triggering a response may be transmitted to the at least one detected wireless communication device.

The disclosed protocol may comprise a definition of an identifier of the entity or of the at least one detected wireless communication device. This identifier may be comprised in the signal received from the at least one wireless communication device. This identifier may be a name of the entity associated with the detected wireless communication device or it may be an identifier used for the medium access control of the data link layer of the wireless communication protocol, to name but a few examples The protocol may further comprise a definition of information comprised in the signal received from the at least one detected wireless communication device indicating whether storing of the identifier of the entity or of the at least one detected wireless communication device is desired or not.

The protocol may also comprise a definition of information comprised in the signal received from the at least one detected wireless communication device indicating whether sending the captured image to the at least one detected wireless communication device is desired or not.

The protocol may yet further comprise a definition of sensor information about the at least one detected wireless communication device. This sensor information may be comprised in the signal received from the at least one detected wireless communication device.

In a second aspect of the invention, a method is disclosed which comprises transmitting information enabling detection of a wireless communication device. The wireless communication device is associated with an entity on an image and the detection occurs before capture of the image, during capture of the image, or after capture of the image.

Also, a computer program code is disclosed, which realizes the method of the second aspect of the invention when executed by a processor.

Further, a computer program product is disclosed in which such a program code of the second aspect of the invention is stored in a computer readable medium. The computer program product could be for example a separate memory device, or a memory that is to be integrated in an electronic device.

Further still, an apparatus is disclosed comprising a transmission component configured to transmit information enabling detection of a wireless communication device, which comprises the apparatus. This wireless communication device is associated with an entity on an image and the detection occurs before capture of the image, during capture of the image, or after capture of the image.

In addition, an apparatus is disclosed comprising means for transmitting information enabling detection of a wireless communication device, which comprises the apparatus. The detection occurs before capture of an image, during capture of an image, or after capture of an image and the wireless communication device is associated with an entity on the image.

According to the second aspect of the present invention, the entity on the image may be a person or an object. A wireless communication device may be associated with a person if, for example, it is owned by that person, if the person is carrying this wireless communication device in a pocket, hand or bag. The person may also have temporarily placed the wireless communication device at some distance, but still within reach, like for example on a table in the vicinity of the person. The wireless communication device may also be associated with an object by being physically attached to the object, or, in case the object is stationary, by also being made immobile in a vicinity of the object.

An image is a photograph, which is either analog or digital, and thus a still picture, or a sequence of such pictures, also either analog or digital, which may constitute a moving picture when viewed in succession. An entity is said to be on an image if the entity is visible in total or in part on the image. An image is captured in the moment that the picture is taken, i.e. in the moment that the either analog or digital data constituting the image is generated by means of optical information present at the time of capture.

The wireless communication device may comprise a user interface. This user interface may comprise a display, a keypad, a microphone, an audio speaker, or light emitting diodes. The wireless communication device may be a mobile phone, a personal, digital assistant, a pager, a mobile camera, a portable music player, a portable video player, or a navigation device. It may also combine all or some of these functionalities.

The transmission component can be implemented in hardware and/or software. It may comprise for instance a processor executing software program code for realizing the required functions. Alternatively, it could be for instance a circuit that is designed to realize the required functions, for instance implemented in a chipset or a chip, like an integrated circuit. The disclosed apparatus could further be for example a module provided for integration into a device, like a mobile phone or a personal digital assistant.

The information enabling detection of a wireless communication device associated with an entity on an image may be transmitted in response to a received detection signal.

The information enabling detection may comprise an information about a received signal strength of the received detection signal.

The information enabling detection may comprise an identifier of the entity or of the wireless communication device. This identifier may for example be the name of the person owning the wireless communication device.

The information enabling detection may further comprise sensor information about the wireless communication device. By way of example, this sensor information may comprise a temperature measured by the wireless communication device and a position determined by a GPS functionality of the wireless communication device.

The information enabling detection may comprise information indicating whether storing of an identifier of the entity or of the wireless communication device is desired or not.

The information enabling detection may further still comprise information indicating whether receiving the captured image by the wireless communication device is desired or not.

The captured image may be received by the wireless communication device in response to the transmitted information enabling detection.

The present invention provides means for identifying persons or objects on an image being captured that, on the part of the persons or objects on the image being captured, solely rely on technology the availability of which may be presupposed. Thus no additional cost or effort is incurred on the side of the entities of which an image is captured.

These and other aspects of the invention will be apparent from and elucidated with reference to the detailed description presented hereinafter. The features of the present invention and of its exemplary embodiments as presented above are understood to be disclosed also in all possible combinations with each other.

DETAILED DESCRIPTION OF THE INVENTION

Figure 1:
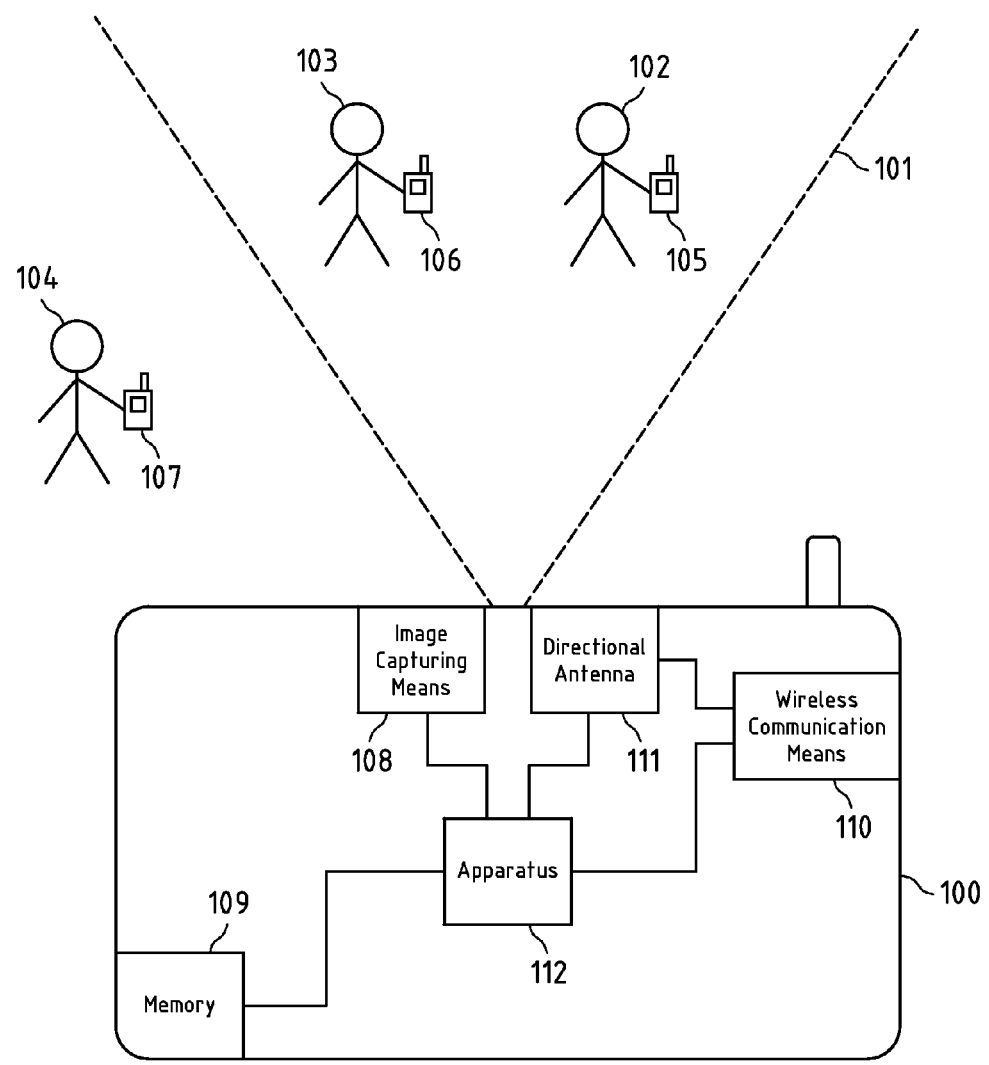
FIG. 1 is a diagram schematically illustrating a situation featuring an exemplary embodiment of the present invention comprised in a device.

FIG. 1 illustrates an exemplary situation, in which the detection of at least one wireless communication device associated with an entity captured on an image can be implemented.

The constellation in this situation is made up of a mobile camera phone 100 capable of capturing images, an angle of view 101 of the image capturing means 108 of the mobile camera phone 100, persons 102, 103 in the vicinity of the mobile camera phone and within the angle of view 101, a person 104 in the vicinity of the mobile camera phone but not in the angle of view 101, and mobile phones 105, 106, 107 associated with the persons 102, 103, 104, respectively.

The mobile camera phone 100 comprises image capturing means 108, including a camera and image processing means, for capturing still images, i.e. photographs, or moving images, i.e. film clips. Sound may also be recorded while the moving images are being captured. The image capturing means 108 have a focal length which may be read out from the image capturing means 108 and also have zoom and magnification capabilities which may also be read out and adapted. The zoom capability of the image capturing means 108 may either be implemented digitally, with zoom lenses, or with a combination of these methods. All these properties define an angle of view 101 of the image capturing means which may also be read out and adapted by modifying the individual parameters defining the angle of view. The angle of view 101 may be understood to represent the area that persons or objects appearing on the image are located in. That is, a person or object located outside this area will not be on the image.

In addition, the mobile camera phone 100 comprises a directional antenna 111. This directional antenna 111 has an adaptable radiation characteristic. This means that it may be adapted so that only signals from certain angles of incidence, given by the adaptable lobes of the directional antenna 111, are detected by the directional antenna 111 and signals from all other angles of incidence, outside the adaptable lobes of the directional antenna 111, are not detected by the directional antenna 111. Alternatively, a directional antenna 111 with adaptable radiation characteristic can also be realized with a set of directional antennas each with fixed radiation characteristic. Each individual such directional antenna may then be selectively activated or deactivated in arbitrary combinations. A directional antenna of this set of directional antennas may either be used exclusively or in combination with other directional antennas of the set.

Any given radiation characteristic of the directional antenna 111 may be equally valid for both receiving signals and transmitting signals. Thus, if the radiation characteristic of the directional antenna 111 is adapted in a certain way for signal transmission and not changed subsequently, the same adaptable radiation characteristic also applies when the directional antenna 111 is used to receive signals. However, the radiation characteristic of the directional antenna 111 may also be freely adapted between transmission and reception, so that the respective radiation characteristic of the directional antenna 111 need not be related for signal reception and signal transmission. Moreover, a rapid adaptation of the radiation characteristic of the directional antenna 111 is possible. The use of the directional antenna 111 also allows the determination of the signal strength of a received signal.

The mobile camera phone 100 further comprises a memory 109 for storing the captured images and also wireless communication means 110. The wireless communication means 110 may be used for a cellular communication network, a satellite communication network, a local area network, a personal area network or any other wireless communication network. For example, the wireless communication means may support one or several of Bluetooth®, WLAN, UWB, or Wi-Fi. Generally the wireless communication means 110 will be configured for communication with several, if not all of these wireless communication networks. The wireless communication means 110 may employ the directional antenna 111 for the wireless communication. When using the directional antenna 111 for wireless communication, the wireless communication means 110 will only receive wireless communication signals that are detected by the directional antenna 111 as defined by its radiation characteristic. Similarly, use of the directional antenna 111 for wireless communication results in wireless communication signals only being transmitted in the direction of the spatial sector from which wireless communication signals are received as defined by the radiation characteristic of the directional antenna 111.

The mobile camera phone 100 also comprises an apparatus 112 connected to the image capturing means 108, the memory 109, the wireless connection means 110, and the directional antenna 111.

In this exemplary situation, persons 102, 103 and their associated mobile phones 105, 106 are situated within the angle of view 101 of the image capturing means 108, whereas person 104 with its associated wireless communication device 107 is situated outside the angle of view 101 of the image capturing means 108.

The apparatus 112 is configured to determine the current angle of view 101 of the image capturing means 108 and also configured to determine when an image is about to be captured and when the image is actually captured. The apparatus is moreover configured to store captured images in the memory 109. The images are stored digitally in the memory 109. The memory 109 may consist of a collection of physically different kinds of memory, for example it may consist of flash memory, random access memory and a hard drive. The memory 109 may also comprise a database. The database may comprise an address book comprising entries for different person with personal data as well as contact information for that person associated with the entry in the database. The images may be captured digitally by the image capturing means 108 or they may be converted to digital images at some point before being stored in the memory 109. The apparatus 112 is also connected to the wireless communication means 110. Thus it may send and receive wireless communication data via the wireless communication means 110. The apparatus 112 is further configured to adapt the radiation characteristic of the directional antenna 111. It may also determine the signal strength of a signal received by the directional antenna 111. By being connected to the directional antenna 111 and the wireless communication means 110, the apparatus 112 is able to access information from any layer of the wireless communication protocols used by the wireless communication means 110.

Figure 6:
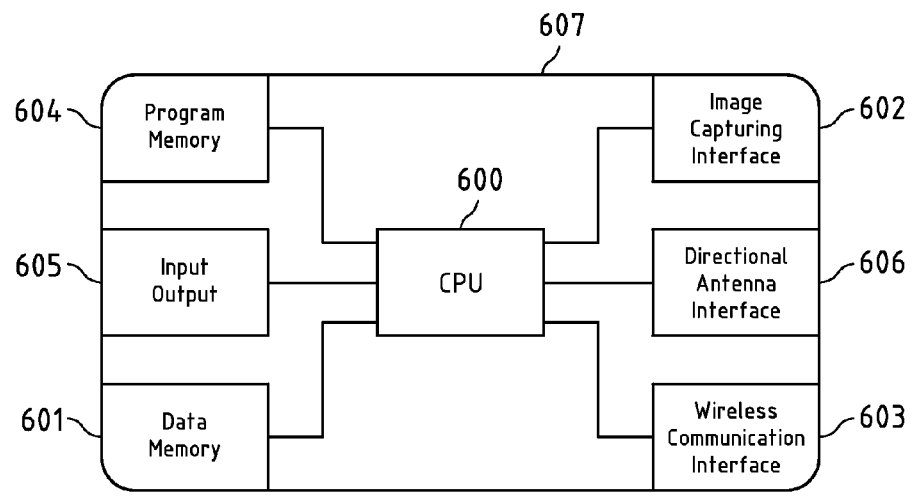
FIG. 6 is a schematic block diagram according to an exemplary embodiment of the invention of the apparatus comprised in the device with the image capturing means in the system of FIG. 1.

FIG. 6 illustrates a more detailed exemplary view of the apparatus 112 from FIG. 1. In this example, apparatus 112 is an integrated chip comprising several modules to implement the functionality of an embodiment of the present invention. The apparatus 112 comprises a central processing unit (CPU) 600. The CPU 600 may also run program code for a wide variety of other functionalities concurrently, for example in separate threads or processes. The CPU 600 has access to a data memory 601 consisting of random access memory. The CPU 600 has further access to read-only program memory 604, in which the program code implementing the functionality of the present invention in this embodiment is stored. In addition, program code implementing other functionality may be stored in the read-only program memory 604.

The CPU 600 is also connected to input output means 605 for communicating with other components. In addition, the CPU 600 has access to an image capturing interface 602, from which information about when an image is about to be captured, information about when an image is being captured, information about the angle of view of the captured image, information about the focal length, zoom and magnification properties of the interfaced image capturing means, and the captured image itself is available. The CPU 600 has further access to a directional antenna interface 606 from which information about the current radiation characteristic of the interfaced directional antenna 111 from FIG. 1 and information about the signal strength of a received signal is available. Moreover, via this directional antenna interface 606 the radiation characteristic and the transmission signal strength of the interfaced directional antenna 111 may be adapted. Furthermore, the CPU 600 has access to a wireless communication interface 603 with which wireless communication means using different kinds of wireless communication protocols may be controlled. The wireless communication interface 603 may be used to transmit data, to receive data and to determine and adjust different characteristics and parameters pertaining to the wireless communication.

Figure 2:
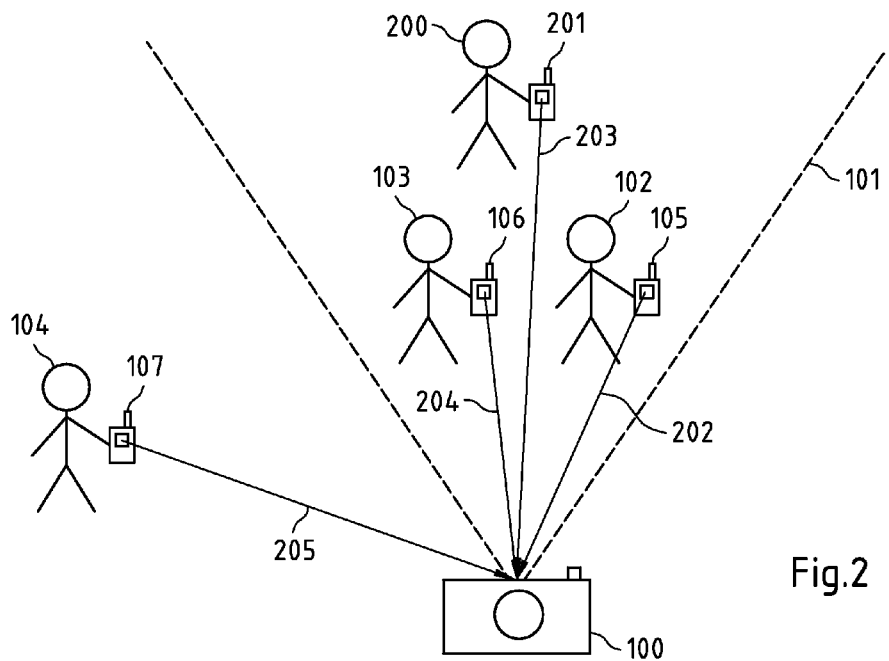
FIG. 2 is a diagram illustrating an exemplary embodiment of the passive detection mode of the present invention.

FIG. 2 illustrates a mobile camera phone 100 comprising apparatus 112 (see FIG. 1) as disclosed above during an operation mode of the present invention denoted as passive detection mode. Mobile camera phone 100 is able to capture images as disclosed above with an angle of view 101 for image capture. Persons 102, 103 carrying their respective mobile phones 105, 106 are near to the mobile camera phone 100 and within the angle of view 101 for image capture. Person 104 with his mobile phone 107 is not within the angle of view 101 for image capture. Person 200 with his mobile phone 201 is within the angle of view 101 for image capture but is situated further away from mobile camera phone 100. The mobile phones 105, 106, 107, 201 comprise wireless communication modules for a personal area network protocol and thus function as wireless communication nodes for this personal area network. The personal area network may be based on any one of Bluetooth®, WLAN, UWB, or Wi-Fi, or another kind of wireless network. The wireless communication means 110 (see FIG. 1) of mobile camera phone 100 also comprise a wireless communication node of this personal area network and thus are also able to communicate using this personal area network protocol.

In the depicted situation, in which a user of the mobile camera phone 100 wants to capture an image, the camera of the mobile camera phone 100 is activated. The user of the mobile camera phone wants to take a picture of persons 102, 103 and thus the angle of view, focal length, zoom and magnification of the image capturing means 108 (see FIG. 1) of the mobile camera phone 100 are adjusted such that person 102, 103 are in the angle of view 101, in focus and visible on the image to be captured. By preparing the image capturing means 108 (see FIG. 1) thus, the apparatus 112 is signaled that an image may be about to be captured, and the accordingly adjusted angle of view 101 as well as the focal length, zoom and magnification of the camera is communicated to the apparatus 112 (see FIG. 1) by the image capturing means 108.

The apparatus 112 (see FIG. 1) now adapts the radiation characteristic of the directional antenna 111 in such a way that only signals coming from within the angle of view 101 of the image capturing means 108 are detected by the directional antenna 111. Since the wireless communication means 110 (see FIG. 1) employ the directional antenna 111 for the wireless communication, the wireless communication means 110 will also only receive signals coming from the angle of view 101 of the image capturing means 108 in the same way. Thus, only signals from mobile communication devices on the image to be captured or associated with persons or objects on the image to be captured will be received by the wireless communication means 110 (see FIG. 1).

The mobile phones 105, 106, 107, 201 associated with the persons 102, 103, 104, 200, respectively, transmit the respective signals 202, 204, 205, 203 in accordance with the wireless communication protocol of the personal area network. In this exemplary embodiment, the wireless communication protocol implements a personal area network that allows the establishment of an ad hoc network. The signals 202, 204, 205, 203 are transmitted independently of the presence of the mobile camera phone 100. They serve to broadcast the presence of the respective wireless communication node of the respective mobile phone to peer wireless communication nodes and are thus necessary far the functioning of the wireless communication protocol. Any other wireless communication node within range using the same protocol is able to receive them, thus also the wireless communication means 108 (see FIG. 1) of the mobile camera phone 100.

Thus the signals 202, 204, 205, 203 transmitted by the mobile phones 105, 106, 107, 201 may be signals necessary for the establishment of a connection via the wireless communication protocol. Alternatively, they may also be signals according to a particular protocol defining the transmission of broadcast signals for the detection of wireless communication devices when taking a picture.

Because the apparatus 112 (see FIG. 1) has caused the adaptation of the directional antenna 111 according to the angle of view 101 of the image capturing means 108, the signal 205 emitted by mobile phone 107 is not detected using the directional antenna 111, only the signals 202, 203, 204 emitted by the mobile phones 105, 201, 106, respectively, are detected by use of the directional antenna 111. Consequently also the wireless communication means 110 (see FIG. 1) receive only the data comprised in the signals 202, 203, 204. The apparatus 112 (see FIG. 1) processes the signals from the directional antenna 111 and the wireless communication means 110 with regard to the fact that any detected signal is transmitted from a wireless communication device within the angle of view 101 of the image that is going to be captured, is captured, or was captured.

The apparatus 112 (see FIG. 1) receives information from the wireless communication means 108 about the data comprised in the signals 202, 203, 204. This includes an identifier of each mobile phone transmitting a signal. This identifier may have been determined by the person associated with the respective mobile phone, for example a given name for the mobile phone, or it may have been determined by an application utilizing the wireless communication protocol. Alternatively, it may be a number used by a lower level protocol layer of the wireless communication protocol for medium access control, which would be a locally unique identification number that the person associated with the mobile phone may not even be aware of. If, as the case may be, the signals 202, 204, 205, 203 adhere to a particular protocol defining the transmission of broadcast signals for the detection of wireless communication devices when taking a picture, then this protocol may define precisely how and what kind of information is comprised in the signals.

The identifier may be a persistent identifier in the sense that an identical wireless communication device may use the identical identifier at different times of mobile communication. For example the medium access control number of a Bluetooth® module of a wireless communication device does not generally change. Also if an identifier associated with the owner of the device is used, this does also not change in general, unless the owner of the device changes.

Thus the apparatus 112 (see FIG. 1) has information about how many wireless communication devices, which are in this case mobile phones 105, 106, 201, are detected, because they are in the angle of view 101 of the image capturing means 108, and the apparatus 112 also has information for distinguishing them in the form of the identifiers disclosed above.

Either the apparatus 112 (see FIG. 1), or the mobile camera phone 100, or both, comprise a database in the memory 109 or in the data memory 601 (see FIG. 6). In this database entries relating to persons or specific objects are stored. For example, all contacts of the owner of the mobile camera phone 100 with all the communication information relevant to each contact are stored in the database. This includes the identifier associated with a wireless communication device of the person in question as disclosed above and as determined by the wireless communication means 110 (see FIG. 1). Thus by matching the identifiers of the wireless communication devices detected by the directional antenna 111 (see FIG. 1) and the wireless communication means 110 with the corresponding identifiers in the database, apparatus 112 may determine the persons associated with each respective detected wireless communication device. In the case that an identifier detected by the directional antenna 111 (see FIG. 1) and the wireless communication means 110 does not match an identifier in the database, apparatus 112 may determine that the corresponding detected wireless communication device is associated with a person that does not have an entry in the database.

When the image capturing means 108 (see FIG. 1) actually capture an image, the apparatus 112 is informed of this. The image is stored in the memory 109 (see FIG. 1) of the mobile camera phone 100. It may in addition or alternatively also be stored in the data memory 601 (see FIG. 6) of the apparatus 112 (see FIG. 1).

Because the apparatus has been continually analyzing the information from the directional antenna 111 (see FIG. 1) and the wireless communication means 110 since the image capturing means 108 of the mobile camera phone 100 has been prepared for taking a picture, and since the apparatus 112 continues to do so for some time after the image has been captured, it has information about the detected mobile communication devices and their respective identifiers shortly before the capture of the image, during the capture of the image and after the capture of the image. Any one of these points in time may be used by the apparatus 112 (see FIG. 1) as being the basis for determining which wireless communication devices are considered associated with persons or objects on the captured image. By way of example, apparatus 112 (see FIG. 1) considers the detected wireless communication devices detected at the same time as the image was captured to be associated with persons or objects on the image. In the situation of FIG. 2 the wireless communication devices 105, 106, 201 are detected by the apparatus 112.

Thus an identifier for each person or object on the image associated with a detected wireless communication device at the time of capture of the image is stored with the image, which identifier is associated with a person in a database of the apparatus 112 (see FIG. 1) if that person is already in the database at the time of the capture of the image.

In addition to the identifier of the wireless communication device, the signal received from each detected wireless communication device may also comprise sensor information of the wireless communication device.

In an exemplary embodiment, the signal comprises the geographical position of the respective mobile phones 105, 106 as determined by their global positioning system functionality. This information is also stored with the image and each identifier of the respective person 102, 103 associated with the respective mobile phone 105, 106 to add context information to the stored image. Other sensor information like temperature or a specific text like a tagline determined by the person carrying the mobile phone may also be transmitted and stored with the image.

Figure 5:
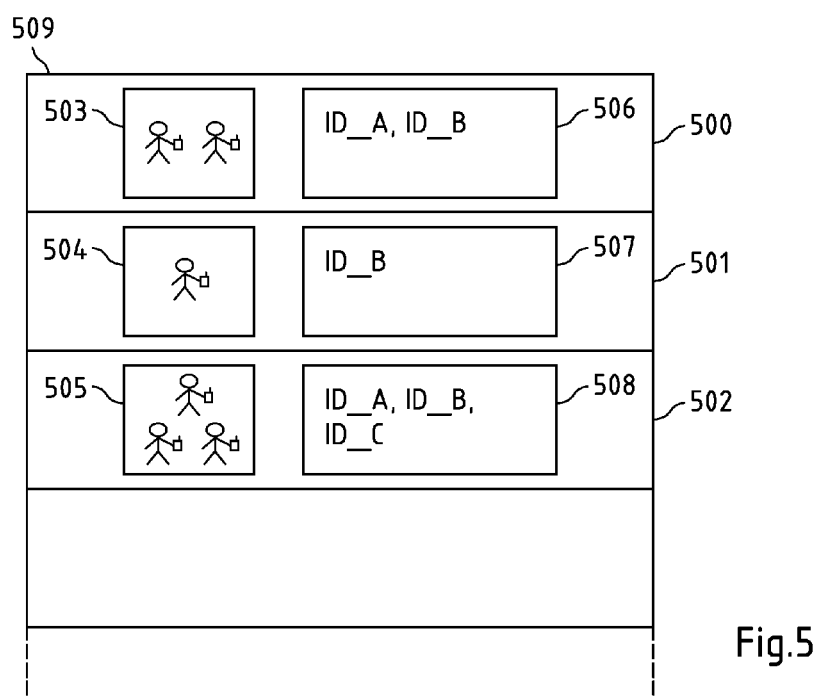
FIG. 5 is a schematic diagram illustrating captured images stored with identifiers of persons on the images according to an exemplary embodiment of the present invention.

FIG. 5 illustrates a portion of memory 509, which may be structured as a database, wherein the images 503, 504, 505 are stored. Alongside each image, also a set of identifiers for each person or object on the image associated with a detected wireless communication device at the time of capture of the image is stored. A first image 503 with two persons on it is stored in the memory slot 500, which may be a database entry. Consequently the set of identifiers 506 stored with image 503 comprises two identifiers, namely ID_A and ID_B corresponding to the first and second person on the image 503, respectively. In addition, a second image 504 is stored in the memory slot 501, which may also be a database entry, and has a single person on it. With it, a set of identifiers 507 comprising the single identifier ID_B corresponding to the second identifier in the set of identifiers 506. Thus from this information it may be determined that the person on the second image 504 is identical to the second person on the first image 503. A further third image 505 with three persons on it is further stored in the memory slot 503, which may be a database entry as well. The set of identifiers 508 stored with the third image 505 comprises three identifiers ID_A, ID_B and ID_C. It follows that two of the persons on the third image 505 are identical to the two persons on the first image 503. The third person is neither on the first image 503 nor on the second image 504. Thus the portion of memory or database 509 may be used to determine whether a person described by their identifier is on a given image. Moreover, all images having a specific person described by an identifier may be found by searching the portion of memory or database 509 for this particular identifier. The portion of memory or database 509 may also be coupled to an address book comprising entries for contacts. The address book may be stored in the same device as the portion of memory or database 509. Alternatively, the address book may be stored on a different device which may be connected to the device comprising the portion of memory or database 509 by means of a wireless connection or by a wire connection. The individual entries for contacts in the address book may be associated with the memory slots or database entries such that each address book entry is associated with those memory slots or database entries in which an identifier of the contact matching the address book entry is stored. For example, in an address book comprising a contact entry for a person with the identifier ID_A, this entry in the address book is associated with the memory slots or database entries 500, 502. Thus a user accessing the address book is able to visualize all images associated with a contact in the address book.

In addition to storing with a captured image an identifier of each person on the image as determined by the detection of an associated wireless communication device, the image may also be associated with a database entry associated with one of the persons on the image. This is performed by, for example, storing a link to the image in the relevant database entry.

Yet further, the captured image may also be transmitted to each of the detected wireless communication devices. This may either be done by using the same wireless communication protocol with which the wireless communication devices were detected by the wireless communication means 110 (see FIG. 1) in the first place. For this purpose the directional antenna 111 (see FIG. 1) may be adapted to transmit in as broad an area as possible, because the desired recipient mobile communication devices have already been determined and may have already been moved out of the angle of view 101 of the image capturing means 108 from the time that the image was captured. Instead of using the directional antenna 111 (see FIG. 1) for this transmission, the wireless communication means 110 may also use an omnidirectional antenna for transmitting the captured image. Alternatively or in addition, the captured image may also be sent to each person associated with a detected wireless communication device if an entry associated with this person is found in a contact or address database. In this case also a different wireless communication protocol may be used for sending the image to the respective person. For example, the wireless communication means 108 may have used the protocol of a wireless personal area network for detecting the peer wireless communication means. Yet a multimedia message service of a cellular wireless communication system may be used for sending a captured image to a person associated with a detected wireless communication device.

The storing of identifiers of persons, the association of stored images with database entries associated with persons, or the sending of the image to detected wireless communication devices or persons associated with detected wireless communication devices may each be done for all detected wireless communication devices and all persons associated with a detected wireless communication device in the angle of view 101 (see FIG. 1) of the captured image. Alternatively, the performing of each of these procedures may depend on other factors.

In a further exemplary embodiment, storing an identifier of a person associated with a detected wireless communication device depends on a determined distance of the detected wireless communication device associated with the person. To this end, apparatus 112 (see FIG. 1) determines a distance at which an object or person on the captured image would appear in focus on the captured image. This distance is determined by apparatus 112 (see FIG. 1) for instance based on the angle of view 101, focal length, magnification and zoom at the time of the capture of the image. This information is supplied by the image capturing means 108 (see FIG. 1) of the mobile camera phone 100. If the determined distance of the detected wireless communication device to the mobile camera phone 100 (see FIG. 1) far exceeds the distance at which an object or person would appear in focus on the captured image, then the identifier of the person associated with that detected wireless communication device is not stored with the image.

One exemplary way of determining the distance according to the situation of FIG. 2 is described in the following:

The apparatus 112 (see FIG. 1) is also informed about a signal strength of each of the signals 202, 203, 204 received by the directional antenna 111. In this case the signal strength of signals 202, 204 will be greater than the signal strength of signal 203, because of the greater distance traversed by signal 203. Based on the signal strengths of the signals 202, 203, 204 apparatus 112 (see FIG. 1) may determine an estimate of the distance of the mobile phones. If according to this estimate the distance of the detected mobile communication device far exceeds the distance at which a person or object would appear in focus on the captured image, then no identifier associated with the person or object associated with that detected wireless communication device is stored.

In the situation illustrated in FIG. 2, persons 102, 103 are in the foreground of the image. Thus the angle of view 101, focal length, magnification and zoom of the image capturing means 108 (see FIG. 1) are configured such that a person or object at a distance of person 102 or 103 is in focus on the captured image. The mobile phone 201 carried by person 200 however is at a significantly greater distance, which fact may be determined by a measurement of the signal strength of signal 203 by use of the directional antenna 111 (see FIG. 1). It follows that it is determined that an identifier of person 200 is not stored with the image data.

Similarly, in the case that the determined distance far exceeds the distance at which a person or object on the captured image would appear in focus, the image might also not be associated with a database entry associated with that person or object associated with that detected wireless communication device.

And further in this case also the captured image might not be sent either to the detected wireless communication device at this distance or to the person in the database associated with the detected wireless communication device.

Figure 4:
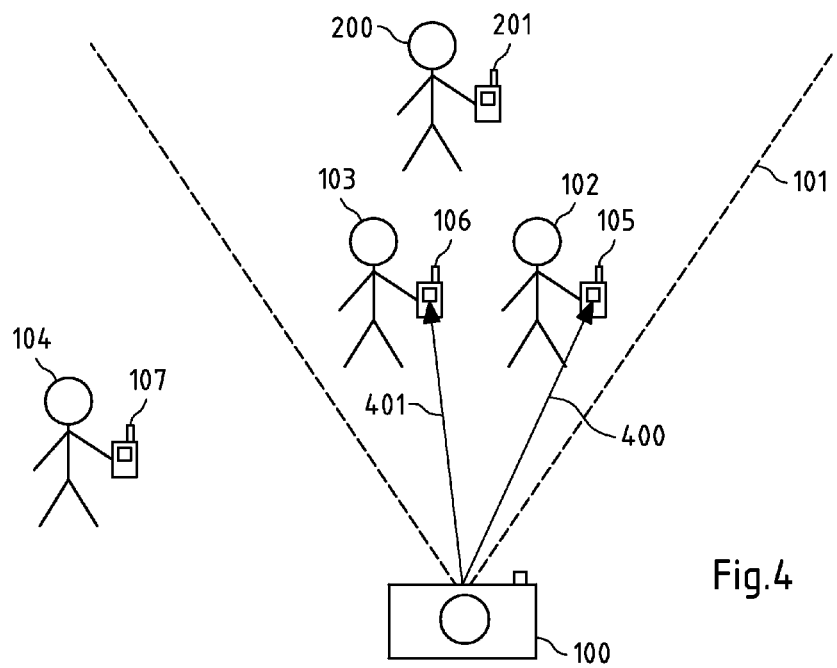
FIG. 4 is a diagram illustrating the transmission of a captured image according to an exemplary embodiment of the present invention.

FIG. 4 illustrates a situation after the image has been captured and stored in the mobile camera phone 100. The image is transmitted to the mobile phones 105, 106 carried by the persons 102, 103 on the image by means of the transmission of the wireless communication messages 400, 401 comprising the image data. The image is not transmitted to mobile phone 107 carried by person 104, because at the time of the capture of the image the radio characteristic of the directional antenna 111 (see FIG. 1) was adapted such that mobile phone 107 was not detected by the directional antenna 111 and the wireless communication means 108. The image may also not be transmitted to mobile phone 201 carried by person 200. This may be the case even though mobile phone 201 was detected by the directional antenna 111 (see FIG. 1) and the wireless communication means 108, because it was determined that the distance between the mobile camera phone 100 and the mobile phone 201 far exceeded the distance at which a person or object captured on the image would be in focus, as was described above.

But in this exemplary embodiment of the invention, the storing of identifiers of persons, the association of images with database entries associated with persons, or the sending of the image to detected wireless communication devices or persons associated with detected wireless communication devices may also depend on the presence of an information in the signal received from the detected wireless communication nodes that such storing of identifiers, or such association of images with database entries associated with persons or the sending of the image to detected wireless communication devices or persons associated with detected wireless communication is desired or not.

The number of electronic devices with wireless communication capability carried by the average person increases steadily. As outlined above, in general an electronic device with wireless communication capability will need to broadcast some information identifying the wireless communication device and possibly also identifying the person carrying the wireless communication device. Especially if a person is carrying several such wireless communication devices, the amount of information provided thus is significantly increased. Consequently a heretofore uncommon situation arises in which personal digital information is broadcast indiscriminately. When a person provides personal information to a company or a state agency, there is usually legislative regulation stipulating that either this information is not stored or not further relayed or is only provided to specific further agencies or companies or sections thereof to the extent that the person in question waives data privacy rights.

Because of a possible legal situation making storing of personal information contingent on the assent of the person in question and also as a matter of courtesy and consideration, the exemplary embodiment of the present invention may only store the interconnection between the image and a person on the image, either by storing the identifier of the person with the image, or by associating the image with a database entry associated with the person, or by sending the image to the wireless communication device associated with the person on the image, if an information was comprised in the signal received from the respective detected wireless communication device that such storing, such association, or such sending to the respective wireless communication device is explicitly allowed. It may also be that such storing, or such association, or such sending to the respective wireless communication device is allowed by default, unless the signal received from the wireless communication device in question comprises a signal explicitly disallowing such storing, such association, or such sending to the respective wireless communication device. If the signal received from the wireless communication device is a signal according to a specific protocol defining the transmission of broadcast signals for the detection of wireless communication devices when taking a picture, then this protocol may also define how a permission or prohibition of using the broadcast identity in different ways is comprised in the signal.

Figure 3:
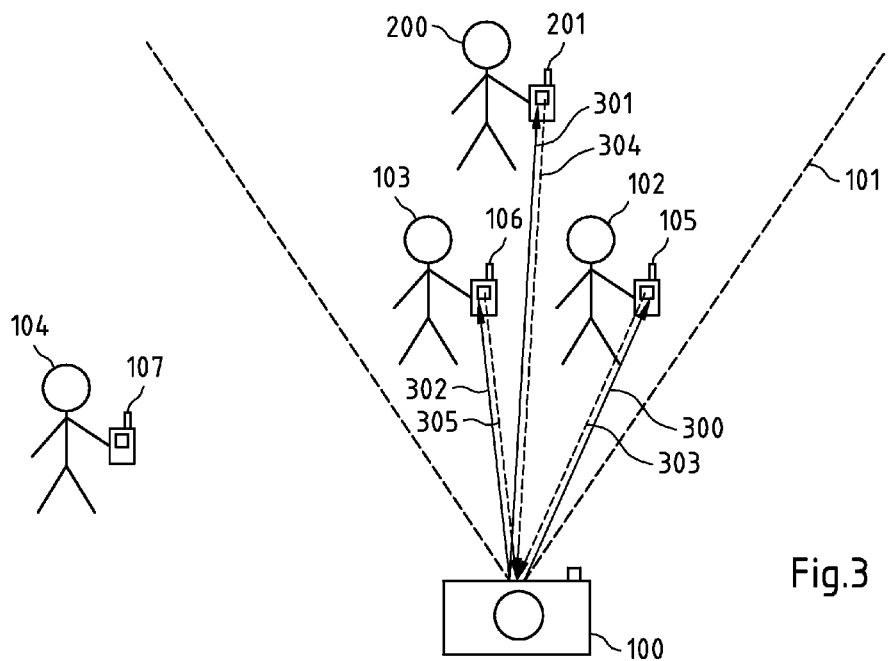
FIG. 3 is a diagram illustrating an exemplary embodiment of the active detection mode of the present invention.

FIG. 3 illustrates the mobile camera phone 100 comprising apparatus 112 (see FIG. 1) as described above during an operation mode of the present invention denoted as active detection mode. As in the situation described for FIG. 2 the user of the mobile camera phone 100 wants to take a picture of persons 102, 103. Thus the angle of view 101, focal length, magnification and zoom of the image capturing means 108 (see FIG. 1) are adjusted such that persons 102, 103 are on the image when it is captured and are in focus. As the image capturing means 108 (see FIG. 1) are prepared for capturing the image, the apparatus 112 adapts the radiation characteristic of the directional antenna 111 in such a way that only signals from within the angle of view 101 of the image capturing means 108 are detected by the directional antenna 111 and consequently also only those signals are processed by the wireless communication means 110. As a further consequence, any signal transmitted by the directional antenna 111 (see FIG. 1) is also only transmitted in the same spatial angle as the spatial angle from which signals are detected by the directional antenna 111 and thus also corresponding to the angle of view 101 of the image capturing means 108. Because the wireless communication means 110 (see FIG. 1) employ the directional antenna 111 for the wireless communication, any message transmitted or broadcast by the wireless communication means 108 will also only be transmitted within the described spatial angle.

In the active detection mode, the signals 202, 203, 204, 205 (see FIG. 2) broadcast by the mobile phones 105, 201, 106, 107 without their broadcast being triggered by the apparatus 112 (see FIG. 1) are ignored by the apparatus 112.

Either before the capture of the image, or during the capture of the image or after the capture of the image, the apparatus 112 (see FIG. 1) causes an indication message to be broadcast via the wireless communication means 108 and the directional antenna 111. This indication message and the signal it is comprised in may be specified according to a protocol for the detection of wireless communication devices when taking a picture. Because of the adapted radiation characteristic of the directional antenna 111 (see FIG. 1), only mobile phones 105, 201, 106 receive the signals 300, 301, 302 comprising the indication message. Mobile phone 107 does not receive a signal comprising the indication message because it lies outside the angle of view 101 of the image capturing means 108 (see FIG. 1) and thus also outside the spatial angle in which the directional antenna 111 transmits.

The indication messages comprised in the signals 300, 302, 302 received by the mobile phones 105, 106, 201 each trigger a respective signal 303, 305, 304 comprising a response message that is transmitted by the mobile phones. The same protocol specifying the indication message may specify the response message and the signal it is comprised in. The protocol may also specify other messages for the communication between the wireless communication devices and the image capturing device, in this case the mobile camera phone 100.

Because the mobile phones were able to receive the indication message transmitted by the directional antenna, the directional antenna can also receive the signals comprising the response messages transmitted by the mobile phones without changing its radiation characteristic.

In a further exemplary embodiment of the invention, however, the radiation characteristic of the directional antenna 111 (see FIG. 1) is adapted so that signals from the widest possible spatial angle comprising the angle of view 101 of the image capturing means 108 at the time of image capture are detected. To this end, the indication message is transmitted before the image is captured or at the same time as the image is captured. In the time it takes the mobile phones 105, 106, 201 that received the signals 300, 302, 301 comprising the indication message to transmit the signals 303, 305, 304, comprising the response messages apparatus 112 (see FIG. 1) adapts the radiation characteristic of the directional antenna 111 to enable signals to be received from a wider angle than the original angle of view 101 of the image capturing means 108. Alternatively, the apparatus 112 (see FIG. 1) may also adapt the directional antenna 111 even to the widest possible angle. This does not change the number and kind of received response signals, because only those wireless communication devices that received the signal comprising the indication message do respond, and the signals comprising the indication message are only transmitted in the direction of the angle of view 101 of the image capturing means 108 (see FIG. 1).

As yet another alternative, the apparatus 112 (see FIG. 1) may cause the wireless communication means 108 to employ an omnidirectional antenna for receiving the signals 303, 304, 305 comprising the response messages.

Thus in the situation that a wireless communication device that has received the signal comprising the indication message moves out of the angle of view 101 of the image capturing means 108 (see FIG. 1) before the response message is transmitted, that response message will only be received when the radiation characteristic of the directional antenna 111 is adapted to receive signals from a wider spatial angle. This situation may in fact frequently arise, because persons tend to congregate for a snapshot picture and then to quickly disperse.

A wireless communication device may be configured not to transmit the response message even though the indication message has been received, for example because of privacy concerns. In that case no response message is received and processed by the apparatus 112 (see FIG. 1) and the result is the same as if that wireless communication device did not exist at all for the purposes of the present invention.

The signals 303, 304, 305 comprising the response messages each comprise an identifier of the mobile phone 105, 201, 106, respectively, transmitting the response message. Each signal 303, 304, 305 comprising a response message also comprises in addition an identifier of the person 102, 200, 103 that the respective mobile phone 105, 106, 201 is associated with.

Each signal 303, 304, 305 comprising a response message may further comprise sensor information detected or indicated by sensors of the wireless communication device transmitting the response message. As an example, this sensor information may comprise a temperature measured by the wireless communication device and a position determined by a GPS functionality of the wireless communication device.

The response message may also comprise information indicating what kind of processing of the information comprised in the response message is allowed. For example, the response message may indicate that storing of the identifier of the wireless communication device transmitting the response message or of the person associated with the wireless communication device is not allowed. The response message may also indicate that associating the image with a database entry of the person to which the wireless communication device transmitting the response message is associated with is not allowed. The response message may also indicate that transmitting the captured image to the wireless communication device transmitting the response message is not allowed. The response message may comprise information regarding all these aspects or an arbitrary combination thereof. The response message may also comprise information allowing or requesting any of the procedures involving an identifier of the wireless communication device or of the person that the wireless communication device is associated with.

Each signal 303, 304, 305 comprising a response message may further comprise an information about the signal strength of each signal comprising the indication message 300, 301, 302 received by the respective mobile phone 105, 201, 106. This information may also be used to determine the distance of the wireless communication device transmitting the response message, in addition to using the signal strength of the signal comprising the response message itself for determining the distance of the wireless communication device.

The properties describing the response message and the signal it is comprised in may also be specified according to a protocol for the detection of wireless communication devices when taking a picture. This protocol may also define the timing and sequence of transmission and reception of events for detecting wireless communication devices for image capture.

Accordingly, in the situation of FIG. 3 the apparatus 112 (see FIG. 1) is informed about the signal strengths of the signals 303, 304, 305 comprising the response messages received by the directional antenna 111. The apparatus 112 (see FIG. 1) is also informed about the information about the signal strength of the signals 300, 301, 302 comprising the response messages received by the mobile phones 105, 201, 106. In this situation also the signal strength of the signals 303, 305 will be greater than the signal strength of signal 304, because of the greater distance traversed by signal 304. Likewise, the information comprised in the signals 303, 304, 305 about the signal strength of the signals 300, 301, 302 received by the mobile phones 105, 201, 106 will indicate that the signal strength of signals 300, 302 when received was greater than the signal strength of signal 301 when received, because analogously to signal 304 signal 301 traversed a greater distance. Thus this information corroborates the determination that the distance to mobile phone 201 and thus to person 200 associated with the mobile phone 201 far exceeds the distance at which a person or object would appear in focus on the captured image.

Consequently in the situation of FIG. 3 it is determined that an identifier of person 200 is not stored with the image data. For mobile phones 105, 106 and consequently also for the associated persons 102, 103, it is determined that their distance does not exceed the distance at which a person or object on the image would appear in focus as determined by the angle of view 101, focal length, magnification and zoom of the image capturing means 108 (see FIG. 1).

Moreover, the signals 303, 304 comprising the response messaged also indicate that the comprised identifiers of the mobile phones 105, 106 and of the associated persons 102, 103 may be processed for all image-related purposes. Thus an identifier for each person 102 and 103 is stored with the image, and the image may also be associated with each of the database entries associated with person 102 and 103. Moreover, the image may be transmitted to the mobile phones 105, 106.

Figure 8:
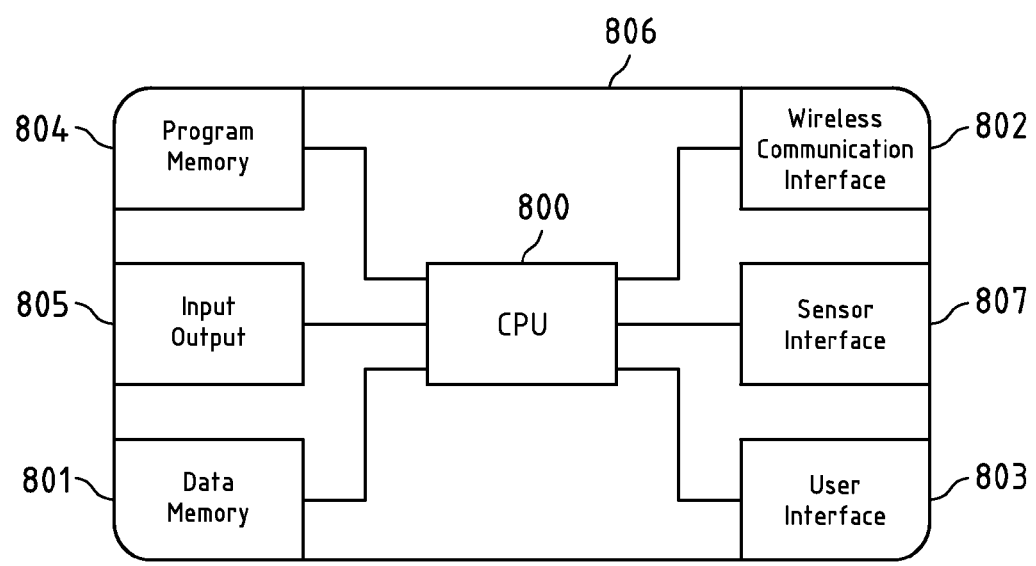
FIG. 8 is a schematic block diagram according to an exemplary embodiment of the wireless communication device in the system of FIG. 1.

FIG. 8 illustrates a more detailed view of an exemplary embodiment of a wireless communication device 806 configured to receive an indication message as described above and to respond with a response message as described above. This wireless communication device 806 may for example be one of the mobile phones 105, 106, 107 from the situation of FIG. 1. In this example, the wireless communication device 806 comprises several modules. The wireless communication device 806 comprises as a first component a CPU 800. The CPU 800 may run program code implementing the functionality of the present invention or it may run program code for a wide variety of other applications. This program code for other applications may, for example, be run in separate threads or processes. A read-only program memory 804 is a second component comprised in the wireless communication device 806. The CPU 800 has access to the read-only program memory 804 that stores the program code implementing the functionality of the wireless communication device. The CPU 800 has in addition access to an input output module 805 comprised in the wireless communication device 806 to communicate with external modules. The CPU 800 has further access to wireless communication means 802 comprised in the wireless communication device 806 enabling transmission and reception of signals and messages and determination of a signal strength of a received signal. The CPU has further access to random access data memory 801 to store new information, for example image data received via the wireless communication interface 802. The data memory 801 may also store moving image and audio data corresponding to film data. Further, the wireless communication device 806 comprises sensor means 807 which the CPU 800 also has access to and which may for instance comprise temperature sensors and/or GPS functionality for determining a position of the wireless communication device. The wireless communication device 806 comprises as yet another module a user interface 803, to which the CPU 800 also has access to and which the user of the wireless communication device 806 may use to start a communication, to change a configuration of the wireless communication device 806 and to view an image or a film stored in the data memory 801.

Figure 7:
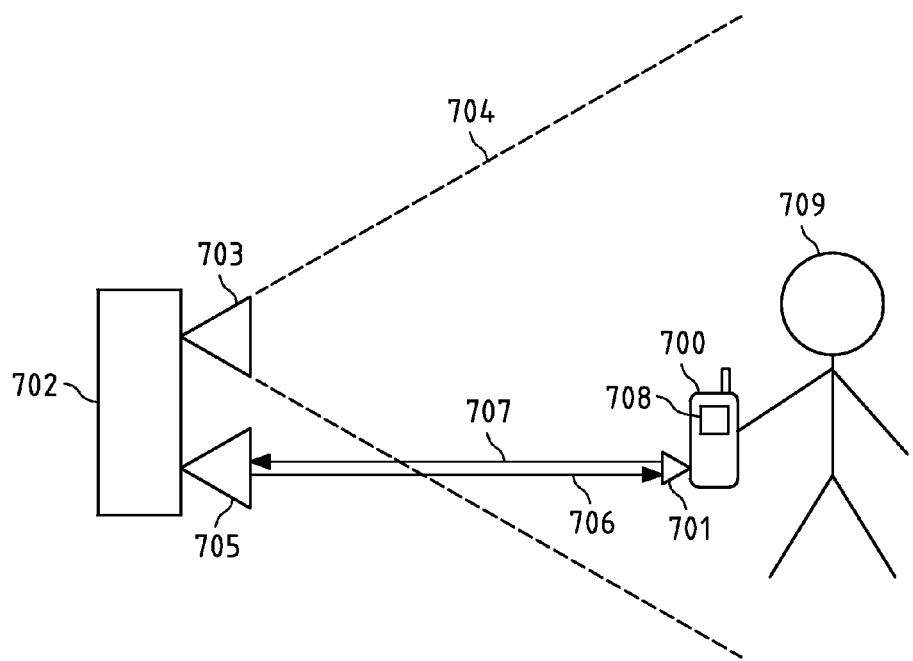
FIG. 7 is a diagram illustrating a system in accordance with an exemplary embodiment of the invention.

FIG. 7 illustrates an exemplary embodiment of a system implementing the present invention. This system comprises an apparatus 702, which in turn comprises a directional antenna 705 and a camera 703. The camera is configured to capture images within an angle of view 704. A wireless communication device 700, for example a mobile phone with a user interface 708 comprising a display, keys, sound recording and playback functionality as well as electronic interfaces, accordingly comprises wireless communication means 701 and is positioned within the angle of view 704. The wireless communication device 700 is associated with a person 709 also within the angle of view 704, which in this case holds the wireless communication device 700 in his or her hand. The radiation characteristic of the directional antenna 705 is adapted in such a way that signals are only transmitted to wireless communication devices within the angle of view 704 of the camera 703 and similarly only signals are received by the directional antenna 705 from within the angle of view 704 of the camera 703. An indication message 706 is transmitted from the directional antenna 705 and received by the wireless communication means 701 of the wireless communication device 700. The wireless communication means 701 as well as the wireless communication device 700 thus communicate using any one of a wide variety of possible wireless communication protocols. The wireless communication protocol used may be any one of Bluetooth®, WLAN, UWB, or Wi-Fi, but is not restricted to one of these protocols.

Either before the sending of the indication message 706, or during the sending of the indication message 706, or after the sending of the indication message 707, the camera 703 is used to capture an image. Person 709 is on the image. The wireless communication device 700 may appear on the image or it may not appear on the image because it is covered by another person or object. For instance, the wireless communication device 700 may be in the pocket of person 709. It is in any case within the angle of view 704 of the camera 705. A response message 707 triggered by the indication message 706 is transmitted from the wireless communication means 701 to the directional antenna 705 and the information comprised in this message further processed by the apparatus 702.

Figure 9:
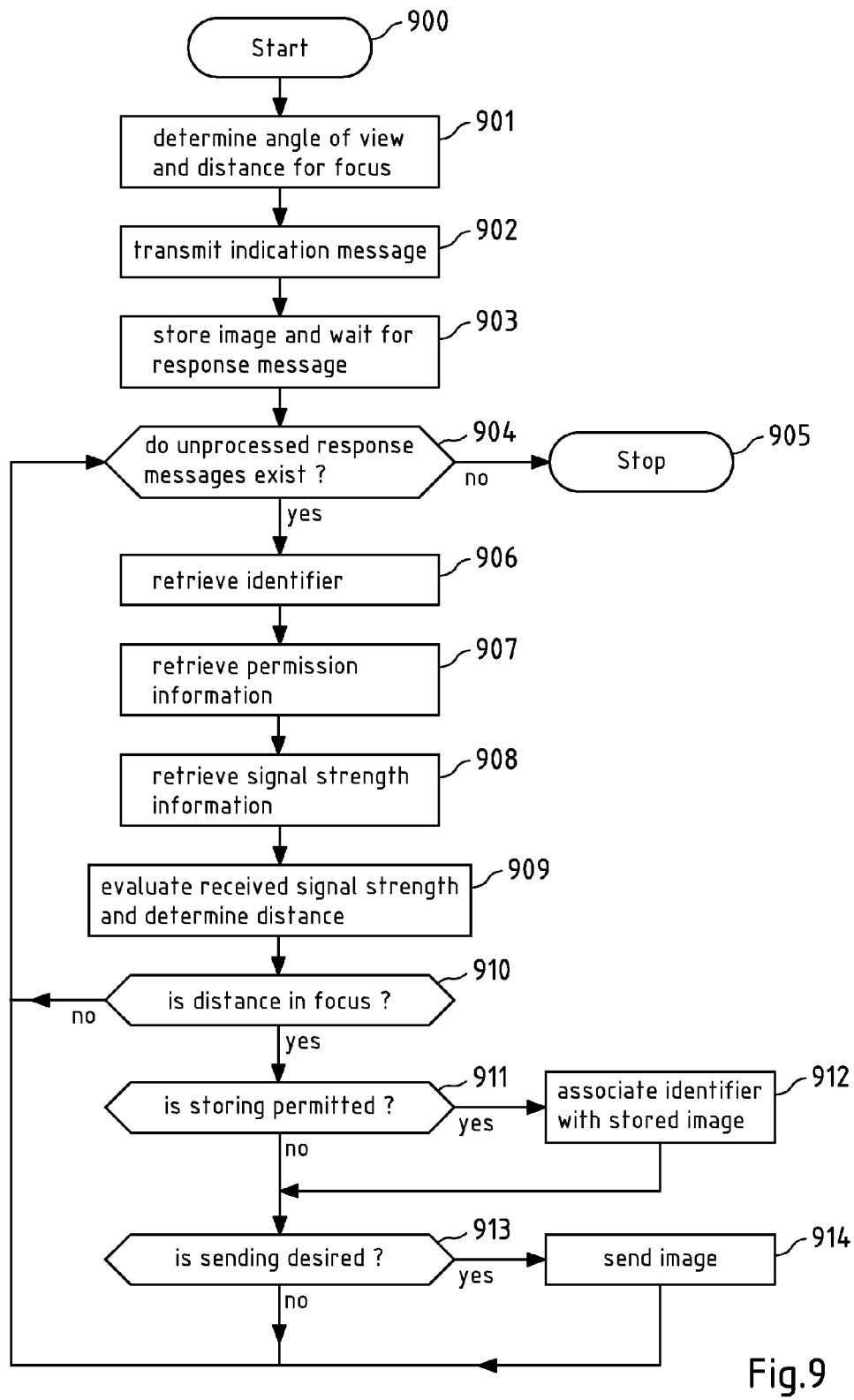
FIG. 9 is a flowchart illustrating an exemplary operation in an apparatus comprised in the device with the image capturing means in the system of FIG. 1.

FIG. 9 illustrates an example of the procedural sequence followed by apparatus 112 (see FIG. 1) according to the teaching of the present invention. The procedural steps illustrated in the flowchart of FIG. 9 may for example be executed by apparatus 112 comprised in mobile camera phone 100 from FIG. 1. These procedural steps may be implemented in a software program code stored in program memory 604 (see FIG. 6) and executed by the CPU 600. These procedural steps and the communication resulting from it may be specified in a protocol.

The start step 900 is entered when the image capturing means of a device are prepared for capturing an image. In case of mobile camera phones, for example, a certain button needs to be pushed to activate the camera or a flip mechanism, if available, needs to be engaged. At the same time, the user determines a certain angle of view by adjusting focal length, magnification and zoom and possibly other settings of the image capturing means. In step 901 the apparatus, which is comprised in the device and which is implementing the present invention, queries the image capturing means and adapts the directional antenna such that it only receives signals from a spatial angle corresponding to the angle of view of the image capturing means according to their current adjustment. Moreover, from the information retrieved from the image capturing means the apparatus determines a distance at which objects or persons captured on an image with the current settings appear in focus on the image.

In step 902, the apparatus is notified that an image is being captured and causes the wireless communication means to transmit an indication message using the directional antenna. Immediately afterwards the directional antenna is adapted such that it receives signals from a wider spatial angle.

In step 903 the image is stored and the apparatus waits a predetermined length of time for reception of one or more response messages, the transmission of which is triggered by the indication message transmitted in the previous steps. In step 904 it is determined if and how many response messages have been received. If no response messages have been received, the stop step 905 is proceeded to. If one or more response messages have been received, the step 906 is proceeded to.

In step 906 an identifier of the wireless communication device and of the person associated with the wireless communication device is retrieved from the response message.

In step 907 sensor information from the wireless communication device and information indicating what kind of storing or association of identifiers is allowed or desired by the wireless communication device from which the response message was transmitted is retrieved from the response message. Furthermore, information indicating whether a transmission of the captured image to the wireless communication device from which the response message was transmitted is desired is retrieved from the response message.

In step 908 the information about the signal strength with which the indication message was received by the wireless communication device is retrieved from the response message.

In step 909 the distance of the wireless communication device from which the indication message was received, and hence also the distance of the object or person associated with the wireless communication device, is determined by evaluating the signal strength information retrieved in step 908 from the response message and by optionally also evaluating the signal strength with which the response message was received. If the thus determined distance is found to exceed the distance determined in step 902 at which a person or object on the captured image would appear in focus by far, then the previously entered step 904 is returned to and a next response message is processed, if present. If the thus determined distance does not exceed the distance determined in step 902 by far, then step 910 is proceeded to.

In this step it is determined whether, according to the information retrieved from the response message in step 902, a storing of an identifier of the person or object associated with the wireless communication device from which the response message was received is desired or allowed. If so, step 911 is proceeded to and if it is not so, step 912 is proceeded to.

In step 911, an identifier of the person associated with the wireless communication device is stored with the image and/or the image is associated with a database entry associated with the person associated with the wireless communication device.

In step 912 it is determined whether, according to the information retrieved from the response message in step 902, the captured image is desired to be transmitted to the wireless communication device that transmitted the response signal. If so, step 913 is proceeded to. If it is not so, the previously entered step 904 is returned to and a next response message is processed, if present.

In step 913 the captured image is transmitted to the wireless communication device either via the same means and protocol with which the indication message was transmitted and with which the response message was received. Alternatively, the captured image is transmitted to the person associated with the wireless communication device from which the response message was received by determining from a database entry relating to the associated person a different way of transmitting the image. For example, the data base entry may comprise information enabling the transmission of the captured image to the associated person via a multimedia message service of a cellular communication system. After step 913, the previously entered step 904 is returned to and a next response message is processed, if present.

Figure 10:
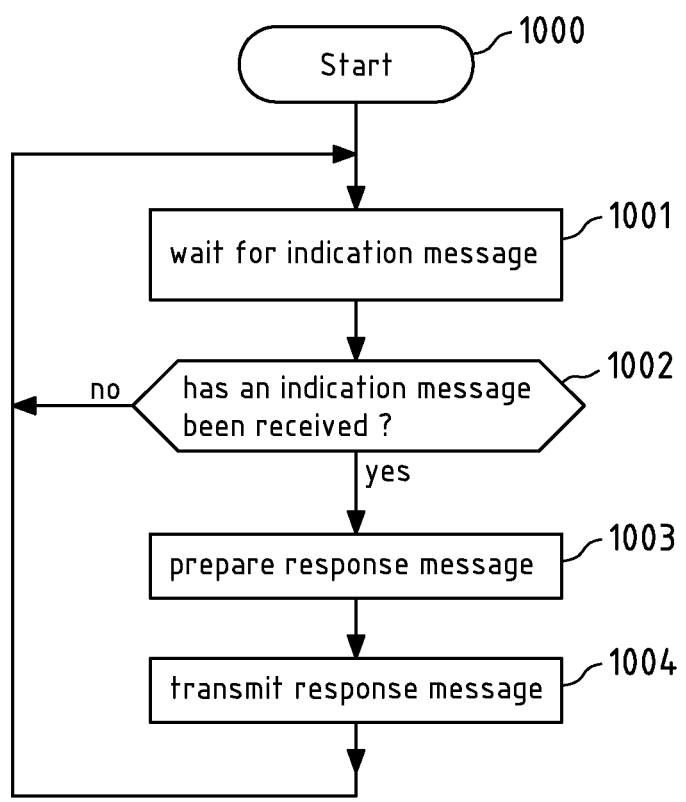
FIG. 10 is a flowchart illustrating an exemplary operation in the wireless communication device of FIG. 8.

FIG. 10 illustrates an example of the procedural sequence followed by a wireless communication device according to the teaching of the present invention. The wireless communication device may for example be one of the mobile phones 105, 106, 107 as illustrated in FIG. 1. The procedural steps illustrated in the flowchart of FIG. 10 may for example be executed by wireless communication device 806 from the context of FIG. 8. These procedural steps may be implemented in a software program code stored in program memory 804 (see FIG. 8) and executed by the CPU 800. The procedural steps and the communication resulting from it may be specified in a protocol.

In the start step 1000 the wireless communication device becomes operational. A mobile phone would be powered up and ready to communicate via any of its communication means.

In step 1001 the wireless communication device waits for a predetermined length of time and is ready to receive a potentially incoming indication message. The signal strength of any incoming signal comprising such an indication message may be measured as well.

In step 1002 it is determined if an indication message has been received. If it has not been received, the previous step 1001 is returned to. If it has been received, the step 1003 is proceeded to.

In step 1002 a response message is prepared. An identifier of the wireless communication device and/or the person or object associated with the wireless communication device is inserted into the response message. Further an information about the received signal strength of the signal comprising the received indication message may be inserted into the response message. Also an information indicating permission, or lack thereof, or the explicit request to store an identifier of the wireless communication device or an identifier of the person or object associated with the wireless communication device with the captured image or to associate a database entry of the person or object with the wireless communication device with the captured image may be inserted into the response message. Further an indication whether or not a transmission of the captured image to the wireless communication device or to the person associated with the wireless communication device may be inserted. Still further sensor information of the wireless communication device may be inserted into the response message.

In step 1004 the response message thus prepared is transmitted. Subsequently the previously entered step 1001 is returned to.

The invention has been described above by means of exemplary embodiments. It should be noted that there are alternative ways and variations which are obvious to a skilled person in the art and can be implemented without deviating from the scope and spirit of the appended claims.

The features of the present invention and of its exemplary embodiments as presented above are understood to be disclosed also in all possible combinations with each other.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

What is claimed is:

1. A method comprising:
transmitting, from a detecting device, a signal triggering transmission, from at least one wireless communication device, of a signal;
detecting, at the detecting device, the at least one wireless communication device one of before, during and after capture of an image, wherein the at least one wireless communication device is associated with an entity on the image, wherein the detecting comprises receiving the signal transmitted from the at least one wireless communication device, and wherein the signal transmitted from the at least one wireless communication device comprises information about a received signal strength of the signal triggering transmission of the signal from the at least one wireless communication device, wherein a radiation characteristic of the detecting device is configured to correspond with an angle of view of the detecting device; and
storing an identifier of one of the entity and the at least one detected wireless communication device with the captured image, wherein the detecting device comprises a directional antenna and an image capturing device, and wherein the radiation characteristic of the directional antenna is configured to correspond with the angle of view of the image capturing device.

2. A method according to claim 1, wherein the signal transmitted from the at least one wireless communication device comprises one of an identifier of the entity and the at least one wireless communication device, wherein the detecting the at least one wireless communication device comprises using the directional antenna of the detecting device.

3. A method according to claim 1, further comprising determining whether to store an identifier of one of the entity and the at least one detected wireless communication device with the captured image, wherein in case of a determination to store an identifier of one of the entity and the at least one detected wireless communication device with the captured image, the identifier of one of the entity and the at least one detected wireless communication device is stored with the captured image.

4. A method according to claim 3, wherein the determining whether to store an identifier of one of the entity and the at least one detected wireless communication device with the captured image depends on a determined distance of the at least one detected wireless communication device.

5. A method according to claim 4, wherein determining of the distance comprises evaluating the information about the received signal strength comprised in the signal transmitted from the at least one wireless communication device.

6. A method according to claim 3, wherein the determining whether to store an identifier of one of the entity and the at least one detected wireless communication device with the captured image depends on an information comprised in the signal transmitted from the at least one detected wireless communication device.

7. A method according to claim 1, further comprising associating the captured image with a database entry associated with the entity with which the at least one detected wireless communication device is associated.

8. A method according to claim 1, further comprising sending the captured image to the at least one detected wireless communication device.

9. A method according to claim 1, further comprising determining whether to send the captured image to the at least one detected wireless communication device depending on information comprised in the signal transmitted from the at least one detected wireless communication device, and in case of a determination to send the captured image to the at least one detected wireless communication device, the captured image is sent to the at least one detected wireless communication device.

10. A computer program product in which a program code is stored in a non-transitory computer readable medium, the program code realizing the method of claim 1 when executed by a processor.

11. An apparatus comprising:
a communication interface configured to transmit a signal triggering transmission, from at least one wireless communication device, of a signal;
wherein the apparatus is further configured to detect the at least one wireless communication device one of before, during and after capture of an image, wherein the at least one wireless communication device is associated with an entity on the image, wherein detecting the at least one wireless communication device comprises receiving the signal transmitted from the at least one wireless communication device, and wherein the signal transmitted from the at least one wireless communication device comprises information about a received signal strength of the signal triggering transmission of the signal from the at least one wireless communication device, wherein a radiation characteristic of the apparatus is configured to correspond with an angle of view of the apparatus; and
a memory configured to store an identifier of one of the entity and the at least one detected wireless communication device with the captured image, wherein the apparatus comprises a directional antenna and an image capturing device, and wherein the radiation characteristic of the directional antenna is configured to correspond with the angle of view of the image capturing device.

12. A method comprising:
transmitting information enabling detection, by a detecting device, of a wireless communication device associated with an entity on an image one of before, during and after capture of the image, wherein the information is transmitted in response to a received signal transmitted from the detecting device to trigger transmission of the information and comprises information about a received signal strength of the received signal, wherein a radiation characteristic of the detecting device is configured to correspond with an angle of view of the detecting device; and
storing an identifier of one of the entity and the at least one detected wireless communication device with the captured image, wherein the detecting device comprises a directional antenna and an image capturing device, and wherein the radiation characteristic of the directional antenna is configured to correspond with the angle of view of the image capturing device.

13. A method according to claim 12, wherein the wireless communication device comprises a user interface.

14. A method according to claim 12, wherein the information enabling detection comprises an identifier of one of the entity and the wireless communication device.

15. A method according to claim 12, wherein the information enabling detection comprises information indicating whether storing of an identifier of one of the entity and the wireless communication device is desired.

16. A method according to claim 12, wherein the information enabling detection comprises information indicating whether receiving the captured image is desired.

17. A method according to claim 12, further comprising receiving a captured image in response to the transmitted information enabling detection.

18. A computer program product in which a program code is stored in a non-transitory computer readable medium, the program code realizing the method of claim 12 when executed by a processor.

19. An apparatus comprising a communication interface configured to transmit information enabling detection, by a detecting device, of a wireless communication device associated with an entity on an image one of before, during and after capture of the image, wherein the information is transmitted in response to a received signal transmitted from the detecting device to trigger transmission of the information and comprises information about a received signal strength of the received signal, wherein a radiation characteristic of the detecting device is configured to correspond with an angle of view of the detecting device;

wherein the detecting device comprises a memory configured to store an identifier of one of the entity and the at least one detected wireless communication device with the captured image, wherein the detecting device comprises a directional antenna and an image capturing device, and wherein the radiation characteristic of the directional antenna is configured to correspond with the angle of view of the image capturing device.

* * * * *